(12) United States Patent
Barraclough et al.

(10) Patent No.: US 8,990,334 B2
(45) Date of Patent: Mar. 24, 2015

(54) RULE-BASED CACHING FOR PACKET-BASED DATA TRANSFER

(75) Inventors: Keith Barraclough, Mountain View, CA (US); David Irvine, San Jose, CA (US); Rodrigo Philander, Sunnyvale, CA (US); Michael J. Albanese, San Jose, CA (US); James Roland Henderson, Morgan Hill, CA (US)

(73) Assignee: Nokia Corporation, Espoo (FI)

( * ) Notice: Subject to any disclaimer, the term of this patent is extended or adjusted under 35 U.S.C. 154(b) by 1927 days.

(21) Appl. No.: 11/435,357

(22) Filed: May 16, 2006

(65) Prior Publication Data

US 2008/0010381 A1    Jan. 10, 2008

Related U.S. Application Data

(63) Continuation-in-part of application No. 09/843,249, filed on Apr. 26, 2001, now Pat. No. 7,139,834, and a continuation-in-part of application No. 11/056,345, filed on Feb. 11, 2005.

(51) Int. Cl.
*G06F 15/167* (2006.01)
*G06F 15/173* (2006.01)
(Continued)

(52) U.S. Cl.
CPC ...... *H04L 67/1095* (2013.01); *G06F 17/30867* (2013.01); *G06F 17/30902* (2013.01); *H04L 67/2814* (2013.01); *H04L 67/28* (2013.01); *H04L 67/2852* (2013.01)
USPC .......................................... 709/213; 709/225

(58) Field of Classification Search
USPC ......... 709/203, 206, 216, 219, 229, 246, 213, 709/214, 215, 223, 224, 225; 707/3; 711/729
See application file for complete search history.

(56) References Cited

U.S. PATENT DOCUMENTS 4,979,118 A    12/1990  Kheradpir
5,774,660 A     6/1998  Brendel et al.
(Continued)

FOREIGN PATENT DOCUMENTS

EP    1 376 398 A2    1/2004
JP    2002-132455 A   5/2002
(Continued)

OTHER PUBLICATIONS

Supplementary European Search Report, PCT/US2007068985, Dec. 15, 2009, pp. 1-9.
(Continued)

*Primary Examiner* — Quang N Nguyen
(74) *Attorney, Agent, or Firm* — Ditthavong & Steiner, P.C.

(57) ABSTRACT

Data transfer to a remote packet-communicating device over a network is effected using a network-based cache to selectively store data. According to an example embodiment of the present invention, a network-based server facilitates selective, rule-based storage of a registered user's data in a network-based cache. The registered user's data is available via the user's data source coupled to a packet-based network (e.g., via a user's home or business computer coupled to the Internet). The server controls remote access to data stored in the cache as well as data accessible via the registered user's data source. For instance, when a request for data transfer is received from a remote packet-communicating device, the network-based server authenticates the request and, for authenticated requests, facilitates a transfer of the requested data from one or both of a registered user's data source and the cache.

14 Claims, 6 Drawing Sheets

(51) Int. Cl.
H04L 29/08 (2006.01)
G06F 17/30 (2006.01)

(56) References Cited

U.S. PATENT DOCUMENTS

| | | | | |
|---|---|---|---|---|
| 5,862,325 | A | 1/1999 | Reed et al. | |
| 5,920,701 | A | 7/1999 | Miller et al. | |
| 6,006,264 | A | 12/1999 | Colby et al. | |
| 6,032,227 | A * | 2/2000 | Shaheen et al. | 711/129 |
| 6,067,565 | A | 5/2000 | Horvitz | |
| 6,112,225 | A | 8/2000 | Kraft et al. | |
| 6,161,133 | A | 12/2000 | Kikinis | |
| 6,167,438 | A * | 12/2000 | Yates et al. | 709/216 |
| 6,298,373 | B1 * | 10/2001 | Burns et al. | 709/203 |
| 6,490,625 | B1 | 12/2002 | Islam et al. | |
| 6,577,601 | B1 | 6/2003 | Wolpert | |
| 6,732,180 | B1 * | 5/2004 | Hale et al. | 709/229 |
| 6,751,664 | B1 | 6/2004 | Kogan et al. | |
| 6,826,597 | B1 | 11/2004 | Lonnroth et al. | |
| 6,871,236 | B2 | 3/2005 | Fishman et al. | |
| 6,993,508 | B1 | 1/2006 | Major et al. | |
| 6,996,720 | B1 | 2/2006 | DeMello et al. | |
| 7,010,500 | B2 | 3/2006 | Aarnio | |
| 7,200,680 | B2 | 4/2007 | Evans et al. | |
| 7,237,029 | B2 | 6/2007 | Hino et al. | |
| 7,254,602 | B1 | 8/2007 | Boivie | |
| 7,299,362 | B2 | 11/2007 | Shen et al. | |
| 7,340,500 | B2 | 3/2008 | Traversat et al. | |
| 7,356,615 | B2 | 4/2008 | Cai et al. | |
| 7,805,315 | B2 | 9/2010 | Goel | |
| 7,827,312 | B2 | 11/2010 | Ramaswamy et al. | |
| 7,917,628 | B2 | 3/2011 | Hesselink et al. | |
| 7,961,645 | B2 | 6/2011 | Gudipudi et al. | |
| 8,042,163 | B1 | 10/2011 | Karr et al. | |
| 2001/0047400 | A1 * | 11/2001 | Coates et al. | 709/219 |
| 2002/0016922 | A1 | 2/2002 | Richards et al. | |
| 2002/0026491 | A1 | 2/2002 | Mason et al. | |
| 2002/0040389 | A1 | 4/2002 | Gerba et al. | |
| 2002/0052798 | A1 | 5/2002 | Nishikado et al. | |
| 2002/0052855 | A1 * | 5/2002 | Landesmann | 709/206 |
| 2002/0052885 | A1 * | 5/2002 | Levy | 707/200 |
| 2002/0056004 | A1 * | 5/2002 | Smith et al. | 709/227 |
| 2002/0077984 | A1 | 6/2002 | Ireton | |
| 2002/0103934 | A1 | 8/2002 | Fishman et al. | |
| 2002/0120574 | A1 | 8/2002 | Ezaki | |
| 2002/0161835 | A1 | 10/2002 | Ball et al. | |
| 2002/0174246 | A1 | 11/2002 | Tanay et al. | |
| 2002/0194324 | A1 | 12/2002 | Guha | |
| 2003/0119386 | A1 | 6/2003 | Laux et al. | |
| 2003/0194998 | A1 * | 10/2003 | Bhide | 455/433 |
| 2003/0204602 | A1 | 10/2003 | Hudson et al. | |
| 2004/0003132 | A1 | 1/2004 | Stanley et al. | |
| 2004/0049462 | A1 | 3/2004 | Wang | |
| 2004/0117845 | A1 | 6/2004 | Karaoguz et al. | |
| 2004/0122958 | A1 * | 6/2004 | Wardrop | 709/229 |
| 2004/0148434 | A1 * | 7/2004 | Matsubara et al. | 709/246 |
| 2004/0181706 | A1 | 9/2004 | Chen et al. | |
| 2004/0199667 | A1 | 10/2004 | Dobbins | |
| 2004/0243839 | A1 | 12/2004 | Bhatia et al. | |
| 2005/0131871 | A1 * | 6/2005 | Howard et al. | 707/3 |
| 2006/0117018 | A1 | 6/2006 | Christiansen et al. | |
| 2006/0168318 | A1 * | 7/2006 | Twiss | 709/238 |
| 2006/0173974 | A1 | 8/2006 | Tang | |
| 2007/0288247 | A1 | 12/2007 | Mackay | |
| 2007/0299681 | A1 | 12/2007 | Plastina et al. | |
| 2008/0060038 | A1 | 3/2008 | Stallings et al. | |

FOREIGN PATENT DOCUMENTS

| | | |
|---|---|---|
| JP | 2002-351729 A | 12/2002 |
| WO | WO 01/03373 A1 | 1/2001 |

OTHER PUBLICATIONS

European Office action for corresponding EP application No. 06718618.9-2413 dated Jan. 21, 2011, 1 page.
European Office action for corresponding EP application No. 06801968.6-2413 dated Feb. 1, 2011, 1 page.
Extended European search report for corresponding EP application No. 06718618.9-2413 dated Jan. 4, 2011, pp. 1-9.
Extended European search report for corresponding EP application No. 06801968.6-2413 dated Jan. 14, 2011, pp. 1-10.
Server-directed transcoding, Mogul, J. C., Computer Communications 24, 2001, Elsevier, pp. 155-162.
Office action for related U.S. Appl. No. 11/051,458 dated Mar. 8, 2011, pp. 1-41.
Office action for related U.S. Appl. No. 11/835,061 dated Mar. 2, 2011, pp. 1-20.
Chinese Office action for correspondiong CN app. No. 200680041085.1 dated Jul. 9, 2010, pp. 1-22.
Final Office Action for related U.S. Appl. No. 11/051,458, Aug. 18, 2011, pp. 1-18.
Office Action for related U.S. Appl. No. 11/219,529, Jun. 8, 2011, pp. 1-32.
Office Action for related U.S. Appl. No. 11/374,409, Jun. 8, 2011, pp. 1-31.
Office Action for related U.S. Appl. No. 11/408,140, Jul. 13, 2011, pp. 1-33.
Office Action for related U.S. Appl. No. 11/700,345, Jun. 10, 2011, pp. 1-51.
Office Action for related U.S. Appl. No. 11/835,061, Jul. 13, 2011, pp. 1-30.
Russian Office action for corresponding RU application No. 2008149517/08(064991) dated May 20, 2011, pp. 1-11.
Office Action for related U.S. Appl. No. 11/408,140 dated Aug. 3, 2012, pp. 1-23.
Office Action for Japanese Application No. 2009-511211 dated Oct. 4, 2011, pp. 1-5.
Office Action for U.S. Appl. No. 11/374,409 dated Oct. 28, 2011, pp. 1-19.
Office Action for U.S. Appl. No. 11/700,345 dated Nov. 18, 2011, pp. 1-39.
Examiner's Answer for related U.S. Appl. No. 11/835,061 dated Nov. 20, 2012, pp. 1-22.
Final Rejection for related U.S. Appl. No. 11/435 dated Oct. 26, 2012, pp. 1-25.
Office Action for related U.S. Appl. No. 11/056,345 dated Dec. 10, 2012, pp. 1-52.
Office Action for related Korean Patent Application No. 2008-7030536 dated Jan. 4, 2013, pp. 1-7.
Final Rejection for related U.S. Appl. No. 11/700,345 dated May 17, 2012, pp. 1-38.
Office Action for related European Application No. 07 797 483.0 date May 3, 2012, pp. 1-5.
Office Action for related U.S. Appl. No. 11/435,344 dated May 3, 2012, pp. 1-23.
Office Action for related U.S. Appl. No. 11/835,061 dated Jun. 7, 2012, pp. 1-15.

\* cited by examiner

RULE-BASED CACHING FOR PACKET-BASED DATA TRANSFER

RELATED PATENT DOCUMENTS

This application is a continuation-in-part of U.S. patent application Ser. No. 09/843,249 entitled "Data Routing Monitoring and Management," filed Apr. 26, 2001 and issued as U.S. Pat. No. 7,139,834, and of U.S. patent application Ser. No. 11/056,345 entitled "Network-distributed Data Routing," filed Feb. 11, 2005, to both of which priority is claimed under 35 U.S.C. §120 for common subject matter.

FIELD OF THE INVENTION

The present invention relates generally to communications and, more particularly, to the remote access of local data over a packet-based network and using a network-based cache for selectively storing the local data.

BACKGROUND OF THE INVENTION

Data communications over a variety of networks, such as Internet protocol (IP) networks, mobile telephone networks and others have increased at an astonishing rate over recent years. The affordability and availability of computers, telephones, wireless devices and other network access appliances has made their use prevalent in a variety of applications. Further, as the demand for network access devices has increased, the diversity in types of network access appliances has also increased, with different devices often implementing different protocols and performance-based operational characteristics.

As access to the Internet and other communications networks becomes easier, convenient and more readily available, these networks are increasingly used for transferring data such as images, audio, email, video and text. In many applications, such data is desirably transferred or shared from a user's computer (or other network access appliance) on a selective basis. For example, data for computer software, music, video, news services, games and other applications is often desirably shared and/or accessed remotely via the Internet and, for many applications, via wireless networks such as those implemented for cellular telephones. Today, the number of network subscribers, data providers, and requests by those subscribers for data transfer, streaming data and other content are growing exponentially. In many such applications, access to data or other content by users owning or subscribing to the data is desirably flexible and controllable by such users. However, the limitations of current systems restrict the ability to meet demands for flexible, controllable access to data or other content in a reliable, secure, efficient and affordable manner.

Content (e.g., audio, images or video) has evolved in application and is readily stored electronically. For example, the storage of music in rewritable electronic media has become a popular method in which to maintain and access music collections. Another example involves video applications, where digital recording and storage of television and personal video collections has become popular, as has the streaming (via the Internet) of audio and video. Photos are often stored and accessed electronically, instead of relying upon conventional printed photos and physical photo albums.

As the electronic storage of content and other data grows in popularity, access to the data as well as convenient manners in which to store the data and become increasingly important. For example, sales of music in downloadable audio formats are becoming increasingly popular. Digital audio players based in the home or office or mobile players that can be used in autos, laptop computers, personal listening devices and others are used for playback of this downloaded music. In order to play the music, audio data is loaded onto mobile players or local computers and used to locally play the music. Typically, the amount of storage space required for storing a large volume of audio data exceeds the memory capacity of digital audio players, computers or other appliances capable of playing music. In this regard, the management and use of audio, as well as other data such as image data and video data, has become increasingly burdensome in view of the demand for and use of this data.

As applied to conventional documents and other types of data (e.g., text-based documents, spreadsheets or presentations), the demand for flexible and efficient access to such data has also grown. For example, many workplaces have become increasingly mobile; employees are often working from a remote location such as at home or at traveling locations. Access to data from remote locations has been particularly useful for facilitating mobility while maintaining a desirable level of access to information. However, the growing size of data files desirably transferred to facilitate mobility or to otherwise provide flexible data access has presented challenges to the delivery of such data over communications channels. For instance, email is generally limited in its ability to transfer large data files, such as audio, video, text and presentation files.

For many communication applications, the increase in use and lack of availability of data transfer approaches requires the creative use of communications channels and data. To meet these and other data transfer needs, networks have been enhanced both in the ability to process larger quantities of data and in the ability to process data at a higher rate of speed. In addition, network access appliances have been improved to increase the speed at which data can be processed and transferred. However, as the demand for high quantity data transfer increases, these needs become more difficult to meet.

One challenge to data transfer on the Internet stems from the inflexibility of data transfer channels. For example, if a data supplier sells data to an end user via the Internet, the end user typically downloads the data using one of only a handful of download locations operated at the control of the supplier. This type of operation can be cumbersome and expensive because the data may have to travel a significant distance and thus take up more time and space in the communications network. In addition, the transfer of data is limited by the location of the download locations.

Another challenge to the effective transfer and management of data is related to the provision of data at an acceptable transfer rate (e.g., as related to bandwidth). Certain network access appliances are limited in their ability to process audio data at different speeds, either by their internal configurations or by the availability of network access. For instance, mobile (wireless) type network access appliances can be limited by the available connectivity to mobile networks. In addition, certain network appliances may be adaptable for wired and wireless communications, with their respective ability to access data being relatively higher (e.g., faster) via wired communications, relative to wireless; when these appliances are operating via wireless communications, they may be able to receive data at a lower speed, or bitrate.

Yet another challenge to data transfer and management stems from the existence of a myriad of different types of data, as well as different types of data access appliances. For example, a variety of different data types are implemented for storing audio files. Often, these data types are associated with a particular type of digital audio device that is being used for playback. In addition, with each data type, there are often different manners in which the data is stored, typically involving different levels of quality (e.g., with different playback bitrates). In this regard, a digital audio player must not only have access to data but also have access to data in a particular format.

Still another challenge to network data transfer involves the management of media rights associated with digital rights management (DRM). As discussed above, digital media such as audio or video can be purchased via electronic delivery. In order to inhibit and/or prevent copying, distribution or other unauthorized use of data, security precautions are taken. In some applications, these security precautions require specific approaches to enable playback, which can further exacerbate difficulties associated with data transfer and subsequent use (e.g., playback).

Effectively and efficiently managing shared data transfer via communication networks has been challenging in the face of the advancement of technologies and trade channels that use or could use network-based data transfer.

SUMMARY OF THE INVENTION

The present invention is directed to approaches to data routing, management and associated applications for making a registered user's data accessible to a remote device. The present invention is exemplified in a number of implementations and applications, some of which are summarized below.

According to an example embodiment of the present invention, an approach to data routing and sharing involves the creation of a network-based cache to selectively store data accessed via a registered user's data source in accordance with user- or network-defined policies. An authenticated remote user accesses registered-user data at one or both of the registered user's data source and the network-based cache, with the access and transfer of data controlled and facilitated by a network-based server in communication with the registered user's data source.

According to another example embodiment of the present invention, remote-user access to registered-user data is facilitated over a packet-based network using a server-hosted approach for an environment involving registered users that provide the data. Data is sent from a registered user data source to a network cache in accordance with the caching rules specified via the registered user. At the registered user data source, a communications link is initiated between the data source and the server. In response to a content request from a remote user, the request is authenticated at the server as a function of authentication information provided by the registered user and information in the request. When the request is authenticated, availability of the requested data at the cache is ascertained in accordance with the caching rules. If the requested data is available at the cache, and in accordance with the caching rules, the transfer of the requested data is directed from the cache to the remote user at a remote packet-communicating device. In response to the availability of the requested data at the cache and to the caching rules, the transfer of the requested data is directed from the data source to the remote user at a remote packet-communicating device, over the packet-communicating network.

According to another example embodiment of the present invention, data is cached for transfer on a packet-communicating network. At a server, a user is registered for sharing data from the registered user's packet-communicating device. The packet-communicating device is programmed with cache engine functions for storing shared data at a network-based cache. Caching policies are received from the registered user, and used to indicate a manner in which to store shared data at the network-based cache. The cache engine sends data to the network-based cache, over the packet-communicating network, as a function of the caching policies and of a current status of shared data that is stored at the network-based cache for the user. The server responds to a remote request for shared data by directing the transfer of shared data in the network-based cache over the packet-communicating network.

In connection with another example embodiment of the present invention, and in an environment involving registered users that provide data for transfer over a packet-based network to a remote packet-communicating device, a server-hosted system facilitates remote-user access to registered-user data over a packet-based network. The system includes a network server and a network cache adapted to receive and store data for caching from registered user data sources. A registered user data source sends data to the network cache in accordance with the caching rules specified via the registered user, and initiates a communications link between the data source and the network server. The network server responds to a content request from a remote user by authenticating the request as a function of authentication information provided by the registered user and information in the request. If the request is authenticated, the server ascertains availability of the requested data at the cache in accordance with the caching rules. If the requested data is available at the cache, in accordance with the caching rules, the server selectively directs the transfer of the requested data from the cache to the remote user at a remote packet-communicating device. In response to the availability of the requested data at the cache and to the caching rules, the server selectively directs the transfer of the requested data from the data source to the remote user at a remote packet-communicating device, via the established communications link.

According to another example embodiment of the present invention, remote cache-based access to data over a packet-based network is facilitated in an environment involving a registered-user that provides data for authenticated remote access via the packet-based network. Data is sent from the registered-user data source to a network cache, over the packet-based network and in accordance with caching rules specified by the registered user of the registered-user data source. Data received at the network cache from the registered-user data source is maintained in accordance with the caching rules. In response to a content request from a remote user, the request is authenticated and, in response to the request being authenticated, the transfer of the requested data is directed from the cache to a remote user at a remote packet-communicating device, over the packet-based network.

The above summary of the present invention is not intended to describe each embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of communications, and the invention has been found to be particularly suited for providing remote access to registered-user data via a packet-based network such as the Internet, with selective, policy-based caching of data in accordance with user characteristics to facilitate the remote access. While the present invention is not necessarily limited to such applications, various aspects of the invention may be appreciated through a discussion of various examples using this context.

According to an example embodiment of the present invention, a data routing system is adapted for communicating registered-user data to a remote user over a packet-based network, selectively using a network-based cache to store registered-user data. Users register with a server for making data at a user data source remotely accessible via the packet-based network. In some applications, the user registration involves the selection of a particular cache size or other cache characteristic, with fees selectively associated with the selection. An agent (e.g., software) is implemented at each registered user's data source and functions in response to the server for controlling the delivery of data from the data source over the packet-based network.

Each registered user establishes caching rules (e.g., caching policies) that are implemented by one or both of the server and the user's agent for accessing and storing the user's data in the network-based cache. For instance, a registered user may specify caching rules indicating that a certain type of data and/or or data in a certain location, be stored (e.g., mirrored) at the network-based cache. The agent implements these caching rules at the data source by accessing and sending the data to the cache.

In some applications, the agent acts directly using caching rules specified locally at a registered user's data source. For example, where the data source includes a computer running the agent software and receiving caching rules as inputs from the registered user, the agent can act independently from the server in sending data to the cache.

In other applications, the agent acts in response to the server. For example, a registered user may specify caching rules that are provided to the server. The server then implements the caching rules by communicating with the agent to direct the agent to access date for the cache and to send the data to the cache (or to the server, which in turn can send the data to the cache).

The transfer of data to the cache is effected in different manners, depending upon the particular application and associated rules or policies. Some applications are directed to a one-time upload of data to the cache. Other applications involve updating the cache as data changes at the data source. For instance, where a registered user specifies that a particular file at his or her home or business computer be mirrored in the cache, the agent and/or server can selectively update the cache when data in the particular file changes via deletion, addition or modification. Still other applications involve the update of the cache upon a condition such as a specified time interval or upon remote access to data in the cache (e.g., where the current status of data in the cache is verified when a request for access thereto is made). In this regard, data in the cache is updated, or mirrored, using one or more of a variety of approaches.

Once stored in the network-based cache, the registered-user data in the cache is available to authorized remote users requesting access to the data. When a remote user requests data via the server, the user is authenticated in accordance with the request using authorization criteria such as a user name and password. For authenticated requests, the server facilitates the delivery of the requested data from one or both of the cache and a registered-user device bearing the data, selecting which source from which to access the data using one or more of a variety of approaches. For instance, access to requested data directly from the cache may, for example, be faster, more efficient, cheaper or otherwise more desirable, relative to accessing the requested data from a registered-user device. In addition, when a registered user's data source is offline or otherwise inaccessible, the cache is used for accessing the requested data (when the requested data is available at the cache); this approach is particularly useful when a registered user device does not have consistent network access or is offline at times.

In another example embodiment of the present invention, an electronic token is created for providing remote-user access to specified files from a registered-user data source, with the specified files stored in a network-based cache for remote access. The registered user creates share information that specifies data to be shared with a particular remote user. The share information is included with an electronic token that is sent to the remote user, who can use the token to request data specified via the token.

Registered user data that is the subject of the token is uploaded, pushed or otherwise sent from the registered-user data source to the cache, where the data is maintained for access by the remote user. This transfer is effected in a variety of manners. In some applications, the registered user selects data to send to the cache. This approach may be useful, for example, where the token specifies a particular file name or type of file to be shared, with actual data in the file location (or having the file type) at the cache not necessarily specified in the token. In other applications, the registered user simply specifies data in the token to be shared, such as by specifying specific files or a specific file location at the data source, and the data is automatically sent to the cache based on the information in the token.

The token is created in different manners, depending upon the application. In some applications, the token is created directly by a registered user using, e.g., data routing software implemented at the registered user's device. In other applications, the registered user provides share information to the server and the server responds by creating the electronic token and making the electronic token available to the remote user.

A server (i.e., as discussed above) hosts the registered user's data sharing functions, and communicates with the registered user's data source and the network-based cache to facilitate data transfer to remote users. The server processes token-bearing requests for data transfer by authenticating the token (e.g., using information from the registered user and in the token) and facilitating the delivery of the data specified via the token to the remote user. Generally, this specified data is stored in the network-based cache; however, if the cache does not contain the data, or if data transfer from the registered user's data source is preferable, the server selectively processes the data request by routing data directly from the data source.

For general information regarding data transfer and for specific information regarding the creation and implementation of an electronic token in connection with one or more cache-based applications discussed herein, reference may be made to U.S. patent application Ser. No. 11/374,414, filed Mar. 13, 2006 and entitled "Token-Based Remote Data Access," which is fully incorporated herein by reference.

In another example embodiment, remote access to registered-user data (selectively via a network-based cache) is controlled using a browser gateway implemented at a host server. Remote users accessing the browser gateway provide authentication information that is used by the host server to determine registered user data to which the remote user has access. In some applications, the browser gateway parses a user-provided token bearing authentication and identification-type information and uses information in the token to control access to data by a particular user specified by the token as discussed above.

Generally, the host server authenticates remote users accessing the browser gateway and provides, to the remote users and via the browser gateway, information specifying data available to remote users. Such available data includes data in a cache for a registered user granting access to the remote user (including scenarios wherein the remote user is also the registered user, remotely accessing his or her data) as well as data available directly via a registered user data source, where appropriate.

In some applications, the browser gateway identifies location information about requested data. For instance, where data is only available at a registered user's data source, the browser gateway identifies the data as such. Where data is available at a cache and the registered user's data source either does not have the data or is inaccessible, the browser gateway identifies the data as available only via the cache. Where data is available at both the cache and the registered user's data source, the browser identifies the data as such.

When a remote user requests data via the browser gateway, the host server serves the request by controlling the routing of data from the cache and/or the appropriate registered user's data source. In some applications, the host server identifies availability of the requested data in the cache and directs routing of the data from the cache (when available) or from the registered user's data source (when the data is not available in the cache).

In connection with the examples described herein, the registered-user data includes data that is available to a registered user's packet-communicating device, such as a personal computer, set top box, web camera, secure monitoring system and/or content storage system at a home or business location with network access, or any combination thereof. Furthermore, a remote user (e.g., using a remote network access appliance) may include one or more individuals, such as members of a household, employees of a business entity or simply an individual given access authorization by a registered user. Further, a "user" may be a machine functioning automatically, for example, as programmed by an individual.

In the context of various examples described herein and shown in the figures, reference is made to several representative devices, networks and network communication approaches. Various terms such as Internet, web-enabled, packet and others may be applicable in the context of different embodiments to facilitate the description of different examples. However, the devices, networks and network communications approaches described in connection with example embodiments herein may be applicable to variety implementations and descriptive terms. For instance, devices that could be described as a web-enabled or Internet appliance may include one or more devices that communicate over a path characterized by one or more of a packet-communicative, web-based and/or Internet-based communications link. In this regard, devices referred to as web-enabled or Internet-related are selectively implemented using one or more of a variety of packet-communicative approaches. Such devices may, for example, access the Internet via non-Internet-based communications approach, such as via one or more wired and/or wireless links that use one or more of a variety of communications approaches. Moreover, packet-communicative approaches described herein are applicable to a variety of network communications approaches, including those involving communications referred to in connection with one or more terms relating to packet, frame, block, cell and segment terms.

Figure 1:
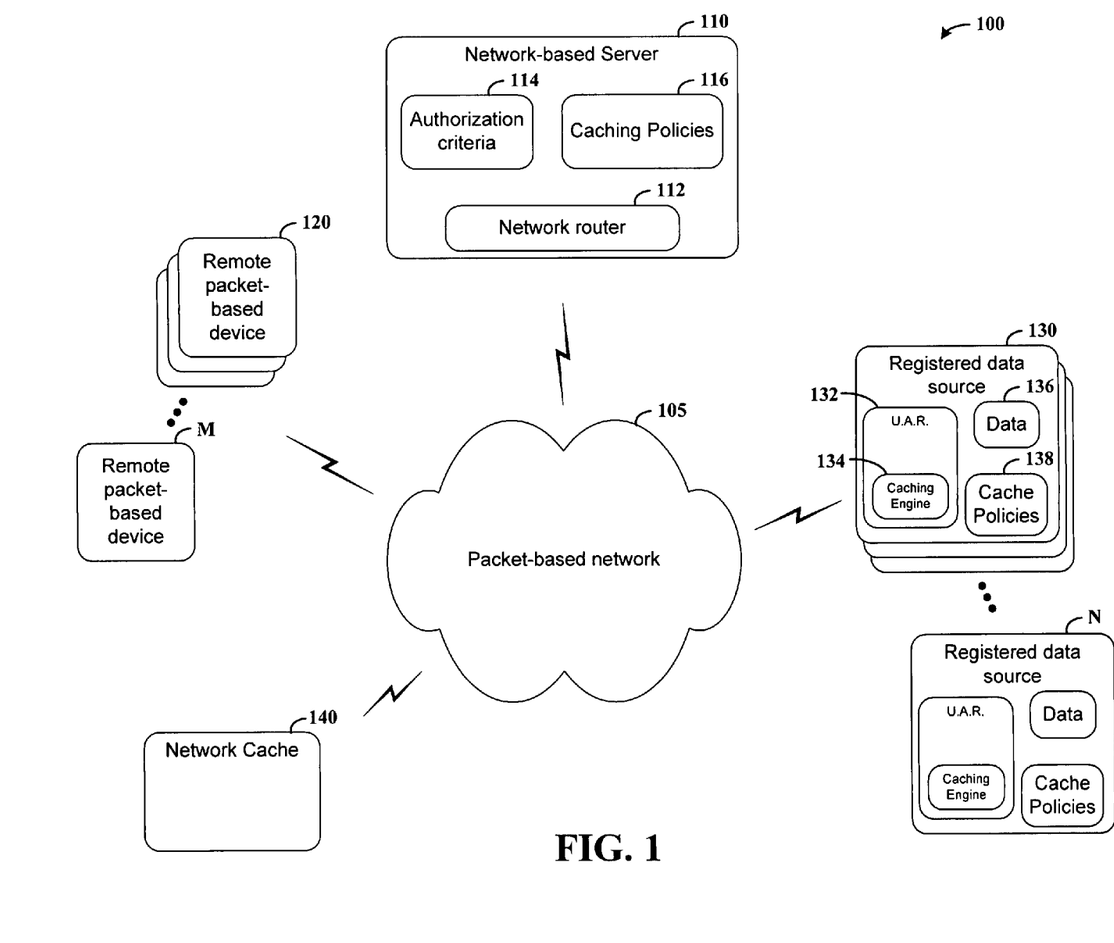
FIG. 1 is a system for routing data via a packet-based network using a server-hosted data access approach with selective, policy-based data caching, according to an example embodiment of the present invention.

FIG. 1 shows a system 100 for providing access to and routing data between registered user data sources and remote packet-communicating devices using a selective caching approach, according to another example embodiment of the present invention. The system 100 includes a network-based server 110, a plurality of remote packet-based devices 120-M, a plurality of registered data sources 130-N and a network cache 140, all of which communicate via a packet-based network 105. The remote packet-based devices include, for example, a mobile telephone, a personal computer (PC), digital media device such as an mp3 player or video player, automobile entertainment system or personal data assistant (PDA) device. Such devices may also be implemented as the registered data sources 130-N, and generally facilitate access to registered-user data at a remote packet-based device either directly or via the network cache 140.

The network 105 includes one or more packet-based networks such as the Internet and, where appropriate, other networks such as a mobile telephone network or a local area network (LAN). In some applications, the network 105 is a local area network implemented for a locality such as a home or business. In other applications, the network 105 is or includes a virtual network or set of virtual application communication channels within a processor or group of processors associated with a computing appliance.

The network cache 140 includes data storage media and has access to the packet-based network 105. While shown as a single item in FIG. 1, the network cache 140 may be implemented with a plurality of devices, at one or more of a plurality of locations. For example, some or all of the network cache 140 may be located at the network-based server 110 or at the registered data source 130.

Each of the registered data sources 130-N includes a user application router (U.A.R.) (see U.A.R. 132 of registered data source 130) that facilitates communication between the registered data source and the network-based server 110, and directs the routing of data from the registered data source over the packet-based network 105. Each registered data source also includes a caching engine (see caching engine 134 of registered data source 130) that facilitates the push of data 136 from the registered data source to the network cache 140 in accordance with caching policies 138.

The network-based server 110 includes a network router 112 that communicates with the registered data sources 130-N for directing the routing of data therefrom. The network-based server 110 selectively uses server caching policies 116 in directing or otherwise controlling the caching of data in the network cache 140. The network-based server 110 also uses authorization criteria 114 to facilitate remote access by remote packet-based devices 120-M to registered user data at the registered data sources 130-N and the network cache 140. The authorization criteria 114 also includes authorization information for registered users and uses the authorization, for example, in specifying registered user preferences for accessing data, caching data or other data-transfer-related functions.

The caching policies 116 and 138 are selectively stored at various locations, depending upon the application. In one instance, all caching policies are stored with the server caching policies 116, with the caching engine 134 accessing the server caching policies remotely. In another instance, all caching policies relative to a particular registered user are stored with the caching policies 138 (referring to registered data source 130 by way of example), with the network-based server accessing the caching policies remotely. In still another instance, the caching policies are stored in another remote location accessible by the network-based server 110 and the registered data sources 130-N.

In some applications, the network router 112 and the U.A.R. 132 (using registered data source 130 by way of example) facilitate communications between each other as follows. When the registered data source 130 powers up, connects to the packet-based network 105 or endures another condition (where no current communications link is established with the network-based server 110), it automatically initiates contact the network-based server. The network-based server then responds to the contact by authenticating the registered data source 130 via authorization criteria 114, and uses the information in the initiating contact to communicate back to the registered data source 130 over the packet-based network 105, therein establishing a communications link. This communications link is then kept active and used for the passing of control information from the network router 112 for controlling the passing of data from the registered data source 130.

Using registered data source 130 by way of example, the caching engine 134 uses caching policies 138 in determining policies to follow, such as those specifying what portions of the data 136 to send to the network cache 140, when to push the data and other conditions as appropriate. For instance, the caching policies 138 may specify a particular data folder to mirror in the network cache 140. The caching engine 134 is responsive to such a caching policy by pushing (sending) data in the particular data folder to the network cache 140. The mirroring involves keeping the data at the network cache 140 up to date by, for example, pushing new data to the network cache and/or deleting data from the network cache in a manner commensurate with changes made to the particular data folder at the registered data source 130.

In some applications, the caching engine 134 (and the U.A.R. 132, as appropriate) works with the network router 112 to facilitate the storage of data at the network cache 140. For instance, data pushed to the network cache 140 may be sent via the network-based server 110. Similarly, updated data for the network cache 140 may be sent via the network-based server 110. Requests for deletion of data from the network cache 140 from the caching engine 134 may also be sent to the network-based server 110, which responds by directing the deletion of the data in the network cache.

The network-based server 110 also selectively controls the network cache 140 for functions such as deleting data in the cache, at the direction of the caching engine 134 or otherwise as specified in server caching policies 116. For instance, where data in the cache has a specified lifetime, or where data in the cache is to be deleted after it is accessed (discussed further below), the network-based server 110 deletes data when such conditions are met.

In some implementations, registered users purchase space in the network cache 140; the network-based server 110 tracks information relative to the purchased space and manages the storage of the registered user's data in the network cache. For instance, where a user purchases and pays for time-limited usage of the network cache 140, the network-based server 110 selectively deletes the registered user's data from the network cache 140 upon expiration of such time (or, e.g., when payment for the usage is not received).

In some applications, the network-based server 110 suspends registered user accounts that are unpaid or otherwise non-current without necessarily immediately deleting data in the network cache 140. The network-based server 110 notifies or otherwise controls the network cache 140 to make data for suspended accounts inaccessible until the account is reinstated. In some applications, this approach involves the denial of requests for data in the network cache 140 received at the network-based server. In other applications, this approach involves setting criteria at the network cache 140 such that the network cache itself limits or prevents access to data.

In applications where the network cache 140 is located at the registered data source 130, the cache may be implemented with networked storage such as that commonly referred to as network-attached storage (NAS) device. For example, the registered data source 130 may have a persistent network connection (e.g., a modem that remains active) and a personal computer (PC) in which the U.A.R. 132 and caching engine 134 reside (i.e., are programmed). Often, a user may wish to power down his or her PC, yet wish to enable remote access to data. In this regard, the user may specify in the caching policies 138 that selected data be cashed on a local NAS device as the network cache 140, and configure the NAS device for remote access by the network-based server 110.

In another embodiment, the system 100 facilitates electronic token-based access to registered data as follows. When a user at registered data source 130 wishes to share particular data with another user (or remotely access the data himself or herself), the registered user directs the creation of an electronic token that specifies information that can be used to identify the data to which access is to be provided. The data that is the subject of the token is pushed to the network cache 140 and the electronic token is provided for access by a remote user. When such a remote user implements the token (e.g., by providing the token with authorization information toe the network-based server 110), the network-based server responds by directing appropriate data from the network cache 140 to the requesting remote user. Once the data specified in the token has been accessed remotely (e.g., and downloaded), the data is selectively removed from the network cache 140. In some applications, data specified in the token is pushed to the network cache 140 at the direction of the registered user directing the creation of the token. In other applications, the network-based server directs the pushing of the data to the network cache when information regarding the electronic token is received thereat. For general information regarding data transfer, and for specific information regarding token-based data transfer applications that may be implemented in connection with these and other example embodiments, reference may be made to U.S. patent application Ser. No. 11/374,414, entitled "Token-based Remote Data Access" and filed on Mar. 13, 2006, which is fully incorporated herein by reference.

The system 100 is adapted to work in a variety of environments involving disparate networks, data source devices, remote packet-communicating devices, data and characteristics thereof. One particular use scenario involves remote data access as follows. When a particular user who is party to the registered data source 130 (e.g., a homeowner having media content stored at his or her home computer) wishes to establish remote access to data, the user signs up for a service provided via the network-based server 110. The network-based server 110 prompts the user for access information to the user's registered data source 130 so that the host application router 112 can interact with the registered data source. This access information (e.g., user names, passwords, access restrictions) is stored with authorization criteria 114.

Once registered, the registered data source 130 makes data 136 available either via the registered data source itself or at the network cache 140 by pushing data to the network cache. In some applications, data for a particular user is made available only via the network cache 140 (i.e., such that the network router 112 does not control or otherwise facilitate the routing of data from the registered data source 130). Once data is made available either directly via the registered data source 130 and/or via the network cache 140, a user at one of the remote packet-based devices 120-M can request and receive data from the registered data source 130 with appropriate authorization and data transfer control, also as discussed above.

Data is transferred via the system 100 in one or more of a variety of manners. The following example approach involves remote user access to data originating at a registered-user's data source, with at least a portion of the data cached. For illustration, this example is discussed in the context of a remote user at the remote packet-based device 120 accessing data originating at registered data source 130, with a portion of the data 136 stored at the network cache 140.

The network-based server 110 hosts a web page accessible by the remote packet-based device 120. The remote user accesses the hosted web page at the remote packet-based device 120 and enters in authorization information that is presented to the network-based server 110. In response, the network-based server uses the authorization criteria 114 with the provided authorization information to either authorize or deny the user access to data originating from the registered data source 130. In some applications, this authorization is selective based upon the type of data requested by the user.

Once authorized, a data request initiated by the user at the remote packet-based device 120 is processed by the network-based server 110. If some or all of the requested data is available at the network cache 140, the network-based server selectively directs transfer of the data in the network cache 140 to the remote packet-based device 140. For instance, when requested data is available at the network cache 140 and the registered data source 130 is offline or otherwise incapable of delivering the data, the network-based server 110 directs data transfer from the network cache 140. Similarly, where the registered user (of the registered data source 130) specifies in caching policies 138 that certain data be routed from the network cache 140, those caching policies are implemented to serve the request. In some applications, the registered data source 130 implements the caching policies 138 to pass information, (either directly to the network cache 140 or via the network-based server 110) that directs the routing of requested data from the network cache 140. In other applications, the network-based server 110 implements caching policies directly for serving data requests. In some instances, the network-based server 110 simply tracks information characterizing data stored in the network cache 140 and routes data therefrom accordingly, without necessarily implementing caching policies.

In some applications where data is available for transfer from the network cache 140 as well as from the registered data source 130, the network-based server 120 selects which source from which to transfer data to satisfy the request. For instance, transfer from one of the network cache 140 and the registered data source 130 may be faster, exhibit higher quality or be less expensive than transfer from the other one of the network cache and the registered data source.

Data transfer to the remote packet-based device 120 from one or both of the network cache 140 and the registered data source 130 is effected in different manners, depending upon the application, available equipment, characteristics of the remote packet-based device or other condition. In some applications, data is routed through the network-based server 110 and passed to the remote packet-based device 120. In other applications, data is routed directly from one or both of the registered data source 130 and the network cache to the remote packet-based device 120 (via the packet-based network 105), without necessarily passing the data through the network-based server 110.

The system 100 is implemented in a variety of manners, depending upon the application. For general information regarding data transfer, and for specific information regarding approaches to data transfer that are selectively implemented with network caching in accordance with one or more example embodiments, reference may be made to U.S. patent application Ser. No. 11/056,345, to which priority is claimed above.

Figure 2:
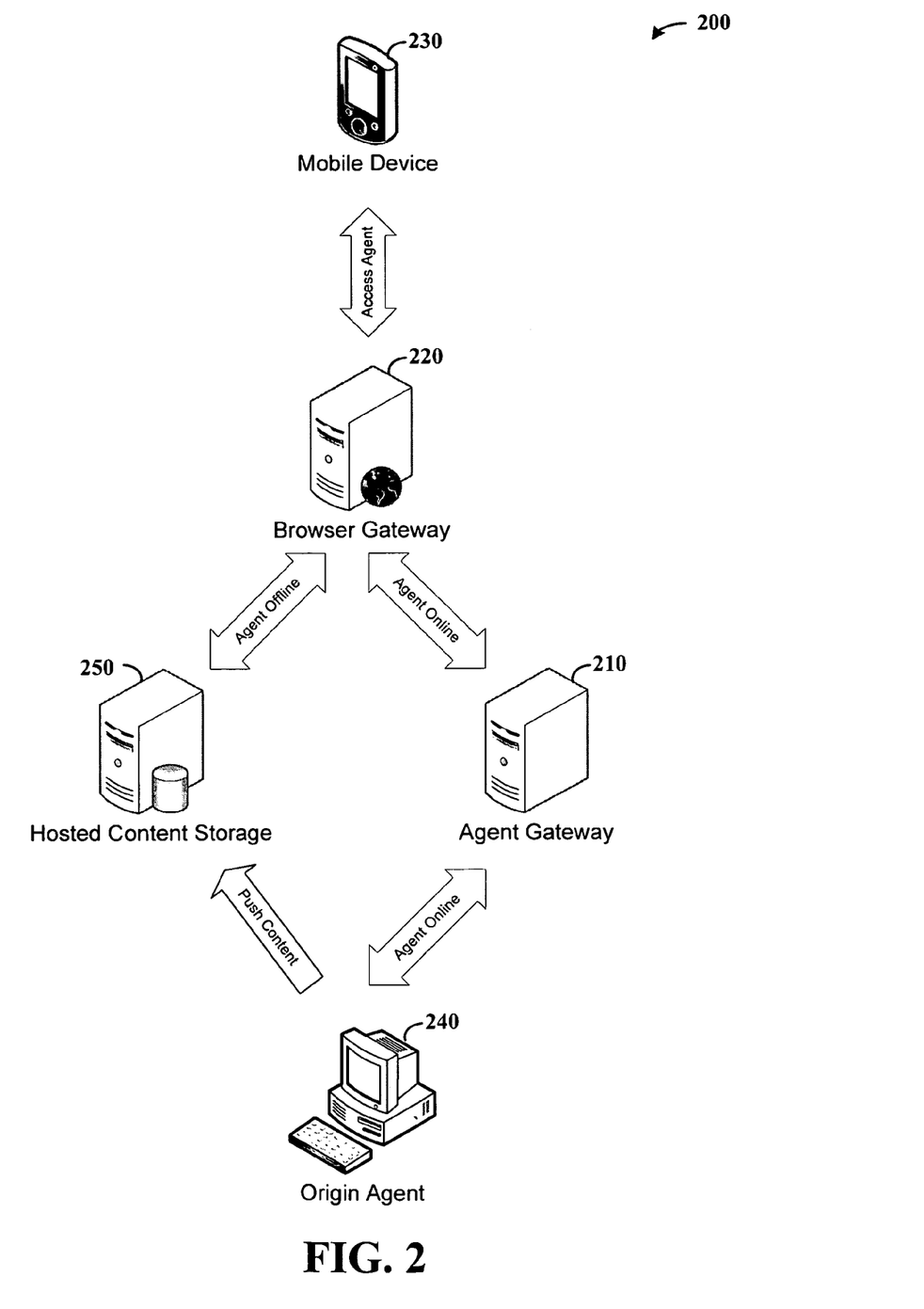
FIG. 2 shows a system 200 for providing remote access to user data, according to another example embodiment of the present invention.

FIG. 2 shows a system 200 for providing remote access to user data, according to another example embodiment of the present invention. The system 200 includes an agent gateway 210, a browser gateway 220 and hosted content storage 250 that facilitate the provision of data, originating via an origin agent at a PC 240, to a mobile device 230 (or other remote device, such as a personal computer). The agent gateway 210 provides a gateway for communications with the PC 240 using, for example, origin agent software implemented at the PC to communicate with the agent gateway 210. The browser gateway 220 provides a gateway for communications with the mobile device 230 using, for example, a web browser interface provided to the mobile device over a packet-based network (e.g., the Internet together with an appropriate mobile communications link).

Generally, the agent gateway 210, browser gateway 220 and hosted content storage 250, together with software implemented at the PC 240, facilitate the access to content, originating at the PC 240, to a user at the mobile device 230. This hosted content access provided via the system 200 can be implemented using, for example, one or more of the example embodiments discussed above, in connection with FIG. 1 and otherwise.

Content is pushed to the hosted content storage 250 in one or more of a variety of manners. In some applications, the origin agent at the PC 240 uses caching policies set by a user thereof to select and push content from the PC to the hosted content storage 250. In other applications, the agent gateway 210 uses similar caching policies to direct the origin agent at the PC 240 to push content to the hosted content storage 250. In still other applications, a user at the PC 240 manually directs the push of content to the hosted content storage 250. A combination of these approaches can also be used to suit particular implementations as appropriate. Once stored at the hosted content storage 250, content available for access by a user at the remote device 230, selectively controlled via the browser gateway 220.

In some applications, content stored at the hosted content storage 250 is actively managed via one or both of the agent gateway 210 and the origin agent 240. For example, when content in a particular file at the PC 240 is mirrored at the hosted content storage 250, changes to content in the particular file at the PC are reflected at the hosted content storage to ensure that the mirrored content is current.

When a user at the mobile device 230 requests content that is available at the hosted content storage 250, the browser gateway 220 selectively facilitates the request by directing the routing of data at the hosted content storage to the mobile device 230. In some applications, the browser gateway 220 directs the routing of requested data from the hosted content storage 250 when the PC 240 is offline, and directs routing of the requested data from the origin agent (via agent gateway 210) when the origin agent is online. In other applications, the browser gateway 220 uses other criteria, such as type of data, available communications links, priority, and cost in determining whether to route data from the hosted content storage 250 or the PC 240. In addition, where requested data is not available at the hosted content storage 250, the browser gateway selectively denies the request or facilitates the routing of the requested data from the PC 240.

Communications between some or all of the different components of the system 200 are facilitated over a packet-communicating network. For example, the origin agent at the PC 240 accesses the agent gateway 210 via a packet-communicating network such as the Internet, with information communicated between the PC and agent gateway over the packet-based network. Similarly, the mobile device 230 communicates with the browser gateway 220 over the packet-based network, either directly (e.g., via direct coupling to a network such as the Internet) or indirectly via a mobile communications link such as a mobile telephone link or a wireless network link.

While shown with a single PC 240 and mobile device 230, the system 200 can be implemented for a multitude of users, with an agent gateway 210 and browser gateway 220 hosted for each respective origin agent (with a PC or other packet-communicating device) and mobile device. For instance, referring to FIG. 1 by way of example, the system 200 can be selectively implemented with a network-based server (110) hosting the agent gateway 210 and browser gateway 220, the PC 240 implemented at a registered data source (130) and a mobile device 230 implemented with a remote packet-based device (120). In addition, in some applications, one or more of the agent gateway 210, browser gateway 220 and hosted content storage 250 are implemented in a common arrangement.

The system 200 is amenable to implementation with a variety of approaches to establishing and facilitating the transfer of content, using registration, authentication and other approaches such as those discussed above in connection with other embodiments. In one example embodiment, a user at the PC 240 registers for providing content to remote users by providing authentication information with other information characterizing content to be made remotely available. The user installs origin agent software at the PC 240 that facilitates communication with the agent gateway 210 for directing routing of content from the PC 240. The user at the PC 240 also specifies policies for storing content in the hosted content storage 250, with the policies used to push data to the hosted content storage and, where appropriate, to automatically manipulate (add, delete or change) the stored data.

When a remote user at the mobile device 230 wishes to access data originating from the PC 240 (or otherwise associated with the registered user of the PC), he or she accesses a web page hosted by the browser gateway 220 and provides authentication criteria. The browser gateway 220 and/or the agent gateway facilitate authorization of the remote user in accordance with the provided authentication criteria and the authentication information provided by the registered user. When the remote user requests data for which he or she is authorized, the browser gateway 220 facilitates the request by selectively transferring the requested data from the hosted content storage 250 and/or the origin agent 240 as appropriate.

The following discussion in connection with FIGS. 3-6 is applicable to a variety of arrangements and applications, and in some applications, to an arrangement similar to that shown in FIG. 2 and discussed above. In addition, each of FIGS. 3-6 are selectively implemented in connection with one another. In this regard, various reference numbers in the following figures correspond to reference numbers in FIG. 2 and/or to other Figures by way of example, and as such are applicable for implementation with approaches as described above. For example, beginning with FIG. 3 below, the origin agent/PC 340 may be selectively implemented in a manner not inconsistent with that discussed above with PC 240 and according origin agent 240 in FIG. 2.

Figure 3:
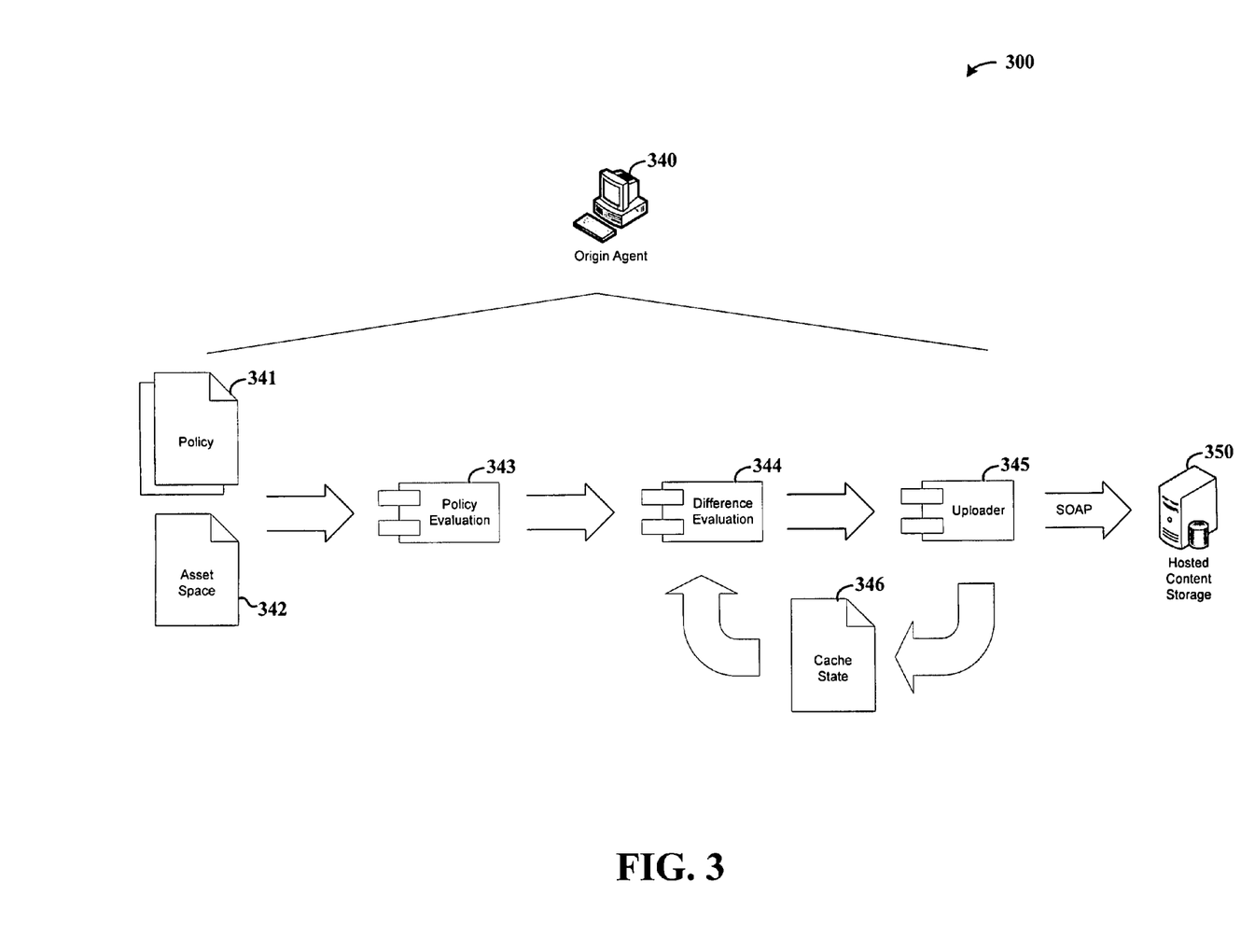
FIG. 3 shows an arrangement and approach for uploading content to hosted content storage, according to another example embodiment of the present invention.

FIG. 3 shows an arrangement 300 and approach for uploading content to hosted content storage, according to another example embodiment of the present invention. A PC 340 is programmed with an origin agent that makes data available and/or pushes data to a hosted content storage arrangement 350.

Data including caching policy (or policies) 341 and asset space information 342 is stored at the PC 340 or in a location that the PC can access. The caching policy 341 includes information specifying policies for caching data available via the PC 340, such as by identifying a particular asset space to mirror in the hosted content storage 350. The asset space 342 characterizes data using one or more characteristics pertaining to the data, such as particular data files, type of data (e.g., images or documents), associated dates, data storage locations or metatags other information. For general information regarding data transfer, and for specific information regarding asset space, example implementations thereof and particular applications for use in connection with one or more example embodiments of the present invention, reference may be made to U.S. patent application Ser. No. 11/219,529, filed on Sep. 2, 2005 and entitled "Data Communication With Remote Network Node", which is fully incorporated herein by reference.

In the context of an application wherein a user at the PC 340 sets preferences (in caching policy 341) for (persistently) mirroring a selected data file in the hosted content storage 350, the origin agent at the PC 340 evaluates the policy 341 at block 343 to identify data to be mirrored at the hosted content storage 350. At block 344, the origin agent evaluates information specified in cache state data 346, if available. If the cache state data is not available (e.g., where data has not yet been mirrored), the origin agent uploads specified data to be mirrored at block 345, with the data going to the hosted content storage 350. Uploading data in this context may include, for example, using simple object access protocol (SOAP), as indicated by example only in FIG. 3, as many communications approaches may be implemented.

If the cache state data 346 is available at block 344, the origin agent compares the state of the date in the hosted content storage to the state of the data at whatever origin the origin agent 340 is pushing the data from. That is, the origin agent compares the state local data (e.g., at PC 340 or at a device coupled there to via a local area network (LAN)) with the last state of data mirrored to the hosted content storage 350. For data that has not changed, the origin agent does not necessarily upload the data to the hosted content storage 350. For data that has been changed, such as indicated via a date or metatags associated with the data, or for data that has been added or deleted to a particular data file, the origin agent uploads changes in the data to the hosted content storage 350. Where data from a particular file has been deleted or where the caching policy 341 otherwise specifies that data is to be removed, the origin agent instructs or otherwise directs the hosted content storage 350 to remove the data.

In some applications, the origin agent also uploads caching policy information at block 345, which is used by the hosted content storage 350 in managing the data stored thereat. Such rules may include, for example, rules for maintaining mirrored data in the cache for a specified amount of time, until a certain event happens (e.g., the data is downloaded to a remote user or a license expires), or until another condition applies.

Figure 4:
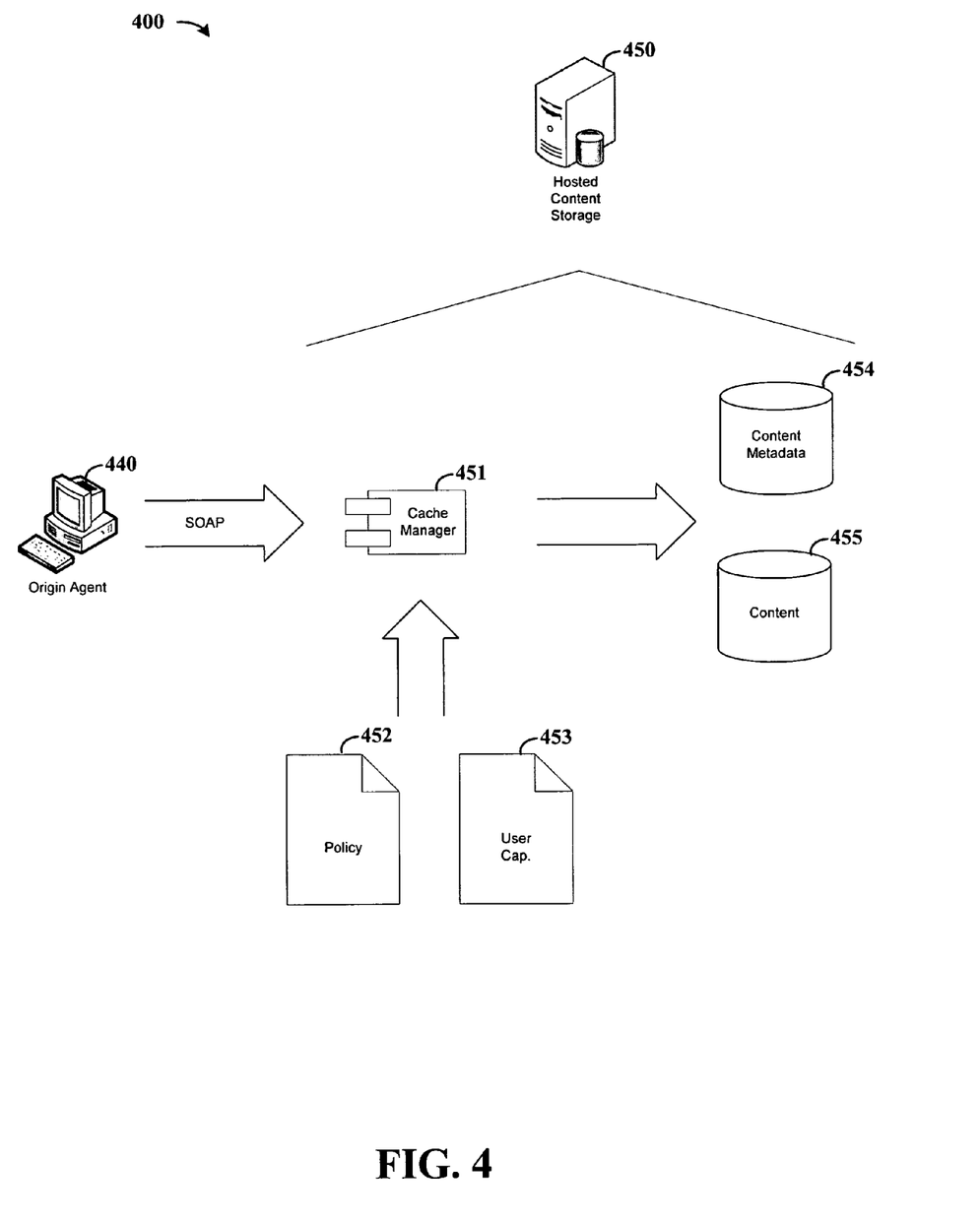
FIG. 4 shows an arrangement and approach for managing the storage of content with hosted content storage, according to another example embodiment of the present invention.

FIG. 4 shows an arrangement 400 and approach for managing the storage of content with a hosted content storage arrangement 450, according to another example embodiment of the present invention. The hosted content storage arrangement 450 includes one or more storage devices such as computers, databases or other storage devices, with access to a packet-communicating network such as the Internet. Here, a database-type arrangement 455 is shown for storing content, and metadata for the content is stored in another database-type arrangement 454. In various applications, the hosted content storage arrangement 450 is implemented in a manner similar to that described above in connection with the hosted content storage 250 or 450 in FIG. 2 or FIG. 3.

Data received from a PC 440 (i.e., at the direction of an origin agent at the PC) is sent to the hosted content storage 450, which implements cache managing functions at block 451 to store and otherwise manage the received data. Caching policy information 452 is used in managing the cache, such as described above in connection with FIG. 3. The content metadata in the database-type arrangement 454 is used to identify characteristics of the stored data, such as dates, data type, file location or other data that can be used in implementing caching policies.

In some applications, user capacity data 453 specifies a capacity of data that can be stored for a particular user. Using this information at block 451, the amount of data (e.g., content) stored with the database-type arrangement 455 is controlled. In some applications, the hosted content storage sends a message to the origin agent at the PC 440 when such a capacity has been met, or would be exceeded with a proposed data transfer. In the latter case, any data transfer exceeding a particular user's capacity is either denied or, in some applications, accepted and a notification is sent back to the origin agent at the user's PC to alert a user of the capacity condition.

In certain applications, a fee is automatically assessed to a user in accordance with the user capacity data 453 and the amount of content stored at the database-type arrangement 455. For example, where the caching policy information 452 specifies that a user capacity can be exceeded but at a fee, the fee is assessed accordingly when that capacity is exceeded.

Figure 5:
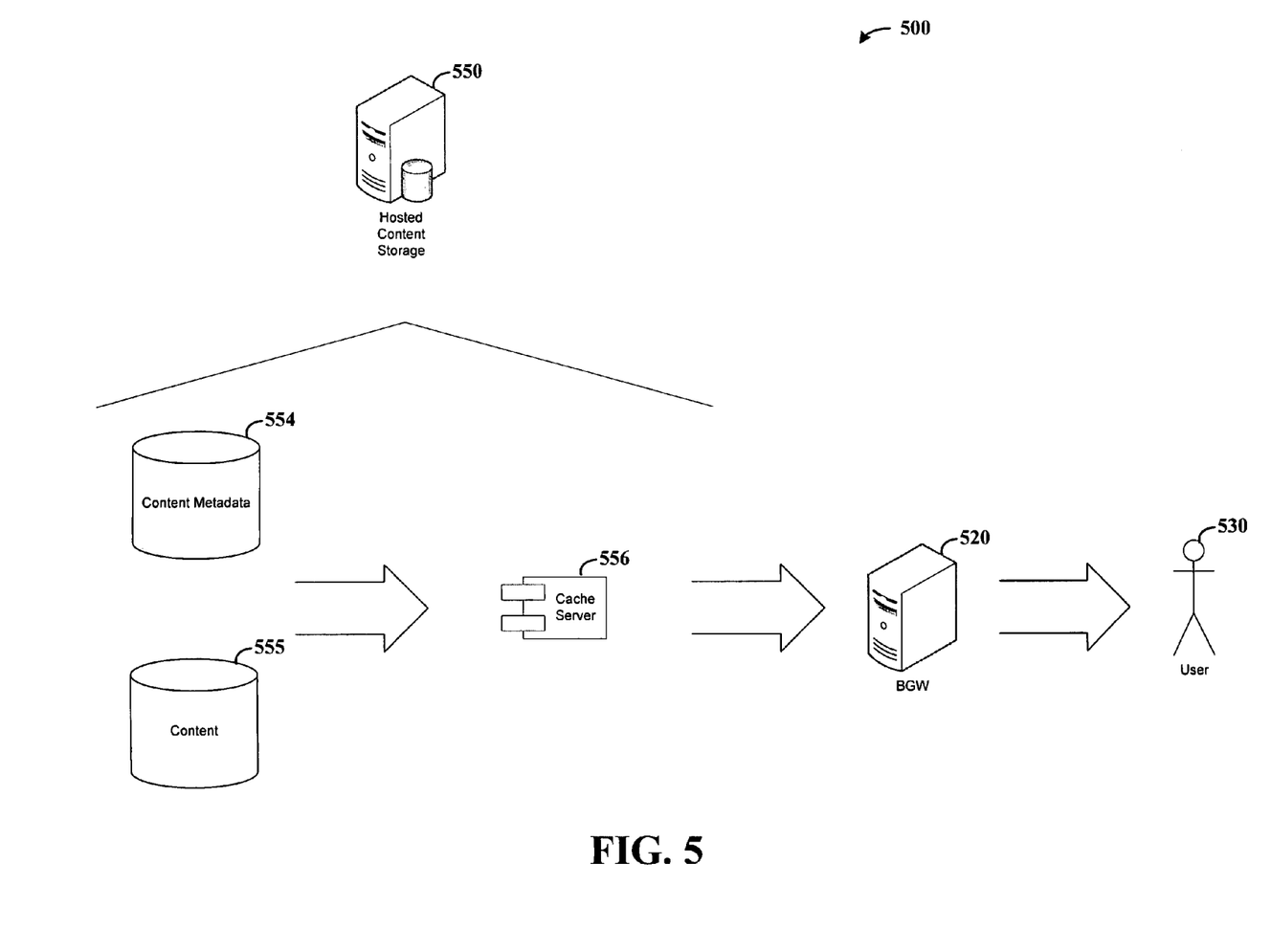
FIG. 5 shows an arrangement and approach for providing content to a remote user from hosted content storage, according to another example embodiment of the present invention.

FIG. 5 shows an arrangement 500 and approach for providing content to a remote user 530 from a hosted content storage arrangement 550, according to another example embodiment of the present invention. Generally, the remote user 530 accesses a browser gateway 520 with a remote packet-communicating device such as a PC, mobile telephone or digital media player. In various applications, the remote user accesses the browser gateway in a manner not inconsistent with that described in connection with the mobile device 230 accessing the browser gateway 230 shown in FIG. 2 and discussed above.

To facilitate the access, the browser gateway 520 generally authorizes the user 530 and any particular content request from the user and, for authorized user requests, accesses the hosted content storage arrangement 550 for retrieving the requested data, or for otherwise directing the hosted content storage arrangement to send the requested data to the user 530.

In response to a request from the browser gateway 520, the hosted content storage arrangement 550 implements cache server functions at block 556 to identify data at a database-type arrangement 555 using metadata information in a database-type arrangement 554. Data corresponding to the request is then sent to the user 530, via the browser gateway 520 or otherwise.

Figure 6:
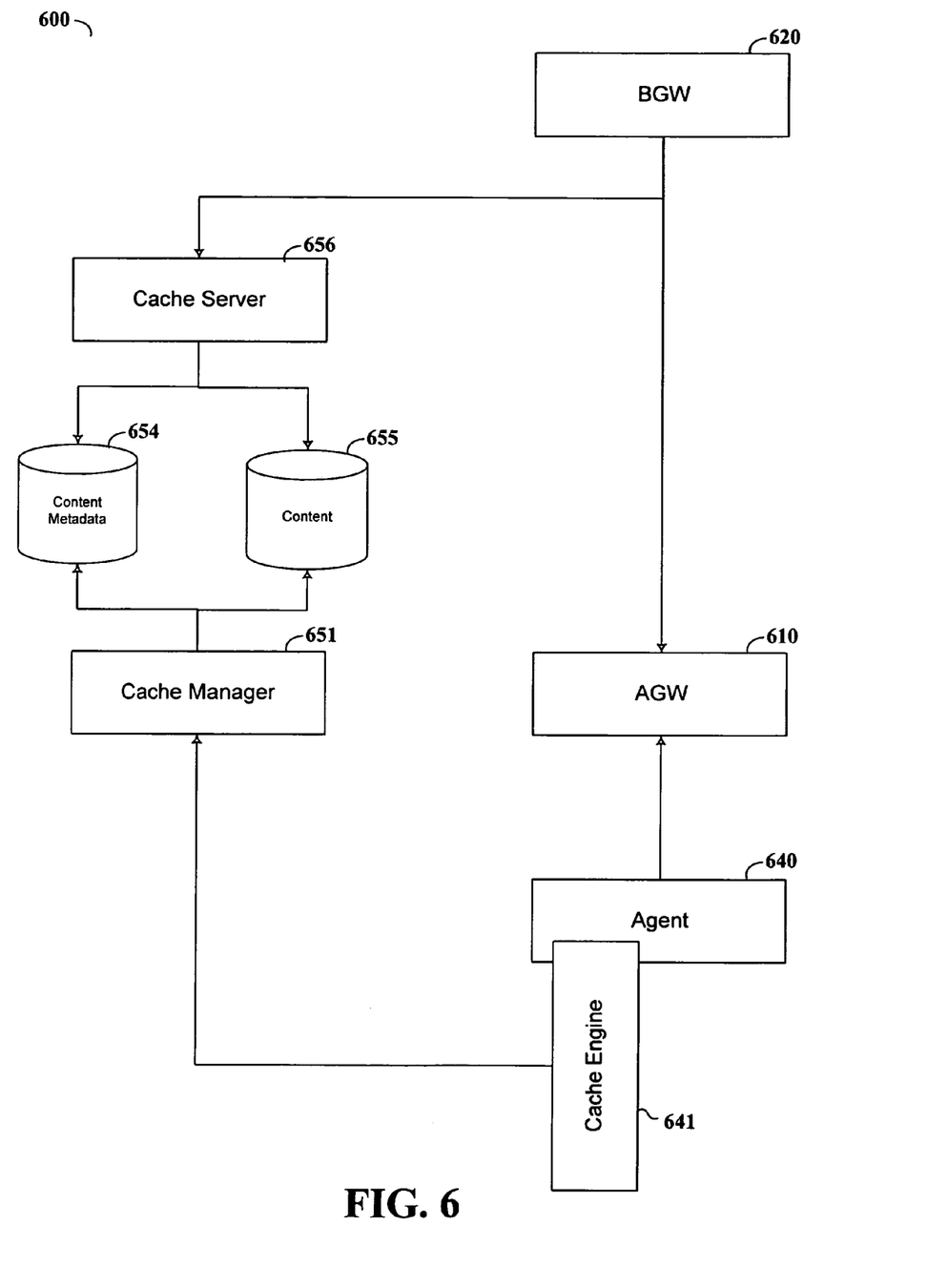
FIG. 6 shows an arrangement and approach for directing the storage of content at hosted content storage, as well as access to the stored content, according to another example embodiment of the present invention.

FIG. 6 shows an arrangement 600 and approach for directing the storage of content at hosted content storage, as well as access to the stored content, according to another example embodiment of the present invention. The arrangement 600 includes an agent gateway 610 that interacts with a browser gateway 620, and which are optionally implemented in a common arrangement. The agent gateway 610 interacts with an agent 640 via a packet-communicating network such as the Internet. The agent 640 is implemented at a registered user's packet-communicating device or system using, for example, software-based programming at a user's PC.

A cache engine 641, also at the registered user's packet-communicating device or system, communicates with a cache manager 651, also via a packet-communicating network such as the Internet. The cache engine 641, as with the agent 640, may be implemented via software programmed at the user's PC. In some applications, the agent 640 and cache engine 641 are implemented with common software on a common PC at the registered user's packet-communicating device or system. Where appropriate, the cache engine 641 and/or agent 640 interact with other content devices at the registered user's packet-communicating system, such as via a LAN, wireless, USB or other type of communications link.

The cache engine 641 uses rules specified by the registered user to push content (e.g., data) to the cache manager 651 for storage with a content database 655. The cache manager 651 stores the content and further stores metadata characterizing the stored at a content metadata database 654. The cache manager 651 also uses rules received via the cache engine 641, or other generally cache-based rules, to manage the storage of the content 655. For example, the cache manager 651 may use date-specific rules, storage limits, event-driven rules and others as described above in connection with the other figures in managing the stored content at the database 655.

A cache server 656 interacts in response to the browser gateway 620 for receiving and processing data access requests. When a particular request is received, the cache server 656 uses content metadata at the database 654 to identify data to retrieve and according accesses the data from the content database 655 and sends it either to the browser gateway 620 (for distribution) or directly to a remote location specified by the browser gateway.

Generally, when a remote user accesses the browser gateway 620 and requests content, the browser gateway authenticates the user is authenticated for receiving the requested content and identifies availability of the content at the content database 655 and/or via the agent 640. When the requested content is available at the content database 655 and/or when the agent 640 is not accessible, the browser gateway 620 directs the routing of the requested content via the cache server 656. When the requested content is not available at the content database 655 and/or when the agent 640 is accessible for retrieving requested content, the browser gateway directs the routing of the requested content via the agent gateway 610.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, the functions carried out by servers, data sources and network caches are selectively implemented together and/or in different arrangements, depending upon the application. Further, data sources (or home network arrangements/devices) are selectively implemented with mobile-type devices, such as mobile Internet appliances (e.g., mobile telephones, laptops or personal devices); data can be made available from such devices to other remote devices. These approaches are implemented in connection with various example embodiments of the present invention. Such modifications and changes do not depart from the true spirit and scope of the present invention, including that set forth in the following claims.

What is claimed is:

1. A method comprising:
    at a computer, registering a user for sharing data from a packet-communicating terminal;
    programming the packet-communicating terminal with cache engine functions for storing shared data at a network-based cache;
    receiving, from the registered user, caching policies by which to store shared data at the network-based cache;
    implementing the cache engine to send data to the network-based cache, over a packet-communicating network, as a function of the caching policies and of a current status of shared data that is stored at the network-based cache for the user; and
    at the computer, responding to a remote request for shared data by directing the transfer of shared data in the network-based cache over the packet-communicating network.

2. The method of claim 1, further including
    receiving, from the registered user, share information specifying a remote user with whom to share data, and specifying data to be shared,
    wherein responding to a remote request for shared data includes responding to a remote request from the remote user specified in the share information, and
    wherein directing the transfer of shared data includes directing the transfer of data specified in the share information.

3. The method of claim 2, further including, in response to the share information,
    generating a notification for the remote user that specifies the data to be shared,
    sending the notification to the specified remote user, wherein the remote request includes information in the notification.

4. An apparatus comprising:
    a processor configured to respond to a content request from a remote user by
    authenticating the request as a function of authentication information provided by a registered user and information in the request,
    in response to the request being authenticated, ascertaining availability of the requested data at a network cache in accordance with caching rules specified by the registered user,
    in response to the requested data being available at the network cache and in accordance with the caching rules, selectively directing the transfer of the requested data from the network cache to the remote user at a remote packet-communicating device, and
    responsive to the availability of the requested data at the network cache and to the caching rules, selectively directing, via an established communications link, the transfer of the requested data from a registered user data source to the remote user at the remote packet-communicating terminal, wherein
    the registered user data source is configured to send data to the network cache by
    comparing information about the data to be sent with the information characterizing data previously sent to the network cache, and
    determining, via the comparison, whether the data to be sent is already in the network cache and, therefrom, sending a portion of the data that is not already in the network cache.

5. The apparatus of claim 4, wherein the network cache maintains stored data in accordance with the caching rules.

6. The apparatus of claim 4, wherein the data source mirrors, at the network cache, a data file at the data source by sending updated data to the network cache in response to a change in the data file at the data source.

7. The apparatus of claim 4, wherein the processor, the network cache and the data source are operated independent from the packet-based network.

8. The apparatus of claim 4, wherein the processor, based on the caching rules, causes the data source to selectively direct the routing of data to the network cache.

9. The apparatus of claim 4, wherein the processor is further configured to respond to the content request by
    directing the transfer of the requested data from the data source when the data source is available via the packet-based network, and
    directing the transfer of the requested data from the network cache when the data source is not available via the packet-based network.

10. The apparatus of claim 4, wherein the network cache removes data from the network cache in accordance with the caching rules.

11. The apparatus of claim 4, wherein the network cache removes data from the network cache in accordance with an expiration of the data established via the data source.

12. The apparatus of claim 4, wherein the processor specifies storage capacity for each registered user storing data in the network cache, the network cache storing data for each registered user in accordance with the specified storage capacity.

13. A method comprising:
- at the network cache, receiving data from a registered-user data source over a packet-based network and in accordance with caching rules specified by a registered user of the data source;
- at the network cache, maintaining data received from the data source in accordance with the caching rules; and
- in response to a content request from a remote user, authenticating the request, and
- in response to the request being authenticated, transferring the requested data from the network cache to the remote user at a remote packet-communicating terminal, over a packet-based network.

14. An apparatus comprising:
- a network server processor; and
- a memory including computer program code configured to, with the processor, cause the apparatus to perform at least the following,
  - administratively control registered user data sources to send user-provided data to a network cache in accordance with caching rules specified by a registered user, using a communications link initiated by each data source for transfer therefrom,
  - in response to a content request from a remote user, authenticating the request as a function of authentication information provided by the registered user and information in the request,
  - in response to the request being authenticated, ascertaining availability of the requested data at the network cache in accordance with the caching rules,
  - in response to the requested data being available at the network cache and in accordance with the caching rules, selectively directing the transfer of the requested data from the network cache to the remote user at a remote packet-communicating terminal, and
  - in response to the availability of the requested data at the network cache and to the caching rules, selectively directing, via the established communications link, the transfer of the requested data from the data source to the remote user at a remote packet-communicating terminal.

* * * * *